United States Patent Office 3,259,615
Patented July 5, 1966

---

3,259,615
3-AMINO-2-HYDROXYPROPYL ESTERS OF ROSIN ACIDS AND METHODS FOR PREPARING THE SAME
John Edward Milks and Robert Dally Dworkin, Stamford, Conn., assignors to Arizona Chemical Company, New York, N.Y., a corporation of Delaware
No Drawing. Filed Jan. 14, 1965, Ser. No. 425,605
13 Claims. (Cl. 260—102)

The present invention relates to novel ester amines and to methods for their preparation. More particularly, it relates to a 3-amino-2-hydroxypropyl ester of a rosin acid and the quaternary ammonium salts thereof. It has as its principal object the provision of utilizing the ester amines and certain quaternary ammonium salts thereof as effective antifungal, antibacterial, herbicidal, fungicidal and nematocidal agents.

The ester amines of the present invention can be represented by the structure:

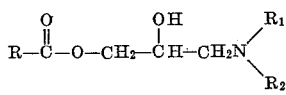

where R is a rosin moiety and $R_1$ and $R_2$ are each hydrogen, alkyl, hydroxy-substituted alkyl, cycloalkyl or aryl. Quaternary ammonium salts of the aforementioned ester tertiary amines are also contemplated as falling within the purview of the invention.

Advantageously, the amino esters of the present invention can readily be prepared by reacting in substantially equimolar proportions a glycidyl ester of a rosin acid with a nitrogen compound, such as ammonia, a primary or secondary amine in accordance with the following equation:

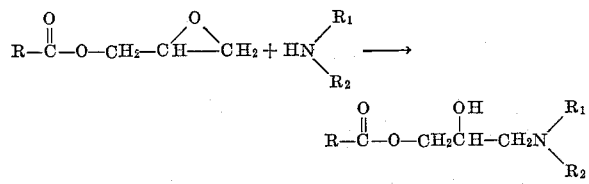

where R, $R_1$ and $R_2$ are the same as defined above. Although equimolar proportions can be used, a molar excess of from 100% to about 300%, or more, of the amine or ammonia reactant is employed for optimum yield recovery.

Illustrative glycidyl rosin ester reactants are: glycidyl abietate, glycidyl rosinate, glycidyl dihydroabietate, glycidyl ester of disproportionated rosin and equivalents thereof.

Exemplary of the nitrogen reactants which can be employed are: ammonia, methylamine, ethylamine, n-propylamine, butylamine, heptylamine, n-nonylamine, stearylamine, aniline, naphthylamine, cyclopentylamine, cyclohexylamine, dimethylamine, diethylamine, distearylamine, dilaurylamine, diisopropylamine, N-methylethanolamine and diethanolamine are reacted with the glycidyl esters of a rosin acid.

The reaction product of the glycidyl ester and the nitrogen compound is readily quaternerized utilizing any well known commercially available quaternizing agents, such as dimethyl sulfate or benzyl chloride. Equimolar amounts of the quaternizing agent and the amino ester are preferably employed for optimum yields.

In general, the above outlined reaction may be carried out by reacting the glycidyl ester with a nitrogen compound at temperatures ranging from about 20° C. to about 150° C., and preferably, from about 60° C. to about 100° C., for from about one to about ten hours. Atmospheric or superatmospheric pressure can be employed.

The invention will be further illustrated by the following examples. These are merely illustrative and are not to be taken as limitative of the invention. Unless otherwise stated, the parts are by weight.

Example 1

A mixture of 75 parts of the glycidyl ester of rosin and 28 parts of dimethylamine is heated for one hour at 75° C. in a rocking autoclave. Removal of the excess amine yields quantitative yields of a viscous residue, 3-dimethylamino-2-hydroxypropyl rosinate, with an equivalent weight of 442 by titration with 0.1 N hydrochloric acid. The equivalent weight expected, based on the oxirane content (4%) of the starting glycidyl ester, is 445. The infrared spectrum shows only ester carbonyl absorption.

Example 2

The glycidyl ester of disproportionated rosin and dimethylamine are reacted by following the procedure of Example 1 in every detail. There is obtained quantitatively a viscous amber liquid with an equivalent weight of 447 identified as 3-dimethylamino-2-hydroxypropyl disproportionated rosinate.

Example 3

To 24.65 parts of the 3-dimethylamino-2-hydroxypropyl ester of rosin, prepared in Example 1 above, is added 6.65 parts of benzyl chloride with stirring, after which the mixture is heated at 110° C. for fifteen minutes. The amber colored solid, having a melting point of from 58° C. to 66° C., is soluble in hot water. A slight turbidity develops when the solution was cooled.

Example 4

A mixture of 3-dimethylamino-2-hydroxypropyl ester of disproportionated rosin (24.25 parts), as prepared in Example 2 above, and benzyl chloride reacted as above yields an amber colored solid, M.P. 62–73° C. The corresponding quaternary ammonium salt is soluble in hot water, but a slight turbidity develops when the solution is cooled.

Example 5

A solution consisting of 5 parts of the glycidyl ester of rosin and 3 parts of n-butylamine is heated at reflux temperature for three hours. Excess amine is removed under reduced pressure to yield a viscous liquid, 3-butyl-amino-2-hydroxypropyl rosinate. Only ester carbonyl absorption at 1730 cm.$^{-1}$ is observed in the infrared spectrum.

Substituting aniline for n-butylamine in the above example, there is obtained in good yield 3-anilino-2-hydroxypropyl rosinate in good yield.

Example 6

Into a suitable rocking autoclave are added 10 parts of glycidyl rosinate and 10 parts of ammonia and heated to 75° C. for about 0.5 hour. Resultant reaction mixture is cooled. There is recovered in good yield 3-amino-2-hydroxypropyl rosinate.

Example 7

In lieu of ammonia, cyclohexylamine are separately reacted in the above example. There is obtained in good yield 3-cyclohexylamino-2-hydroxypropyl rosinate, respectively.

Example 8

An immiscible mixture of 164 parts of glycidyl rosinate and 84 parts of diethanolamine is heated at 80° C. with stirring for eight minutes, after which an exotherm occurred. The temperature is maintained at 80–100° C. with cooling when necessary. Complete reaction had occurred after an additional twelve minutes reaction time to recover in good yield 3-(bis[2-hydroxyethyl]amino)-2-hydroxypropyl rosinate.

Residual diethanolamine is removed by dissolving the mixture in 600 parts (by volume) of methylene dichloride and washing three times with 300 parts of water. The amino ester, a liquid, recovered by evaporating the solvent, is obtained in substantially quantitative yields.

Quaternization of the ester is accomplished by adding 10.7 parts (0.85 mole) of dimethyl sulfate dropwise to 47 parts (0.85 mole) of the ester heated to 100° C. The mixture is stirred vigorously during the addition and heating is continued for twenty minutes at 120–125° C.

The quaternary ammonium salt so-prepared is soluble in water, chloroform, alcohol and acetone at room temperature.

Example 9

To demonstrate the antibacterial activity of the amino esters and the quaternary ammonium salts of the invention, the following is presented.

The agar streak method for assaying antibiotic activity as described in Industrial and Engineering Chemistry, Analytical Edition, 17, page 556 (1945) by S. A. Waksman is employed to test each of the compounds prepared in the above examples. They are found to be effective against the following organisms: *Mycobacterium smegmatis* (ATCC 607), *Staphlococcus aureus* (ATCC 6538P) and *Bacillus subtilis* (ATCC 6633). The concentration of the test compounds, 500 parts per million, or less, inhibit the growth of these organisms.

We claim:
1. A compound selected from the class consisting of an amino ester of the structure:

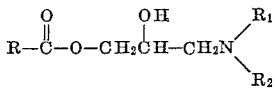

where R is a rosinyl substituent and $R_1$ and $R_2$ are each a substituent selected from the group consisting of hydrogen, alkyl, hydroxy-substituted alkyl, cycloalkyl and aryl and the quaternary ammonium salts thereof.

2. The compound: 3-dimethylamino-2-hydroxypropyl rosinate.
3. The compound 3-dimethylamino-2-hydroxypropyl disproportionated rosinate.
4. The compound: the benzylchloride salt of 3-dimethylamino-2-hydroxypropyl rosinate.
5. The compound: the dimethylsulfate salt of 3-dimethylamino-2-hydroxypropyl rosinate.
6. The compound: 3-bis[2-hydroxyethyl]amino)-2-hydroxypropyl rosinate.
7. A process for preparing amino esters of the structure:

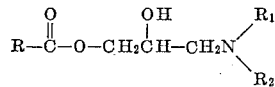

where R is a rosinyl substituent and $R_1$ and $R_2$ are each a substituent selected from the group consisting of hydrogen, alkyl, cycloalkyl and aryl which comprises the steps of: reacting at 20° C. to 150° C. in at least equimolar proportions (a) a glycidyl ester of a rosin of the structure:

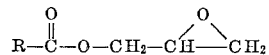

where R is a rosinyl substituent with (b) a nitrogen compound of the structure:

where $R_1$ and $R_2$ are each substituents selected from the class consisting of hydrogen, alkyl, hydroxy-substituted alkyl, cycloalkyl and aryl and recovering the amino ester.

8. The process of claim 7 wherein the amino ester is further reacted with a quaternizing reagent.
9. The process of claim 7 wherein the amino ester is further reacted with dimethyl sulfate.
10. The process of claim 7 wherein the amino ester is further reacted with benzyl chloride.
11. The process of claim 7 wherein the glycidyl ester reactant is glycidyl ester of rosin and the nitrogen compound is diethanolamine.
12. The process of claim 7 wherein the glycidyl ester is glycidyl ester of rosin and the nitrogen compound is dimethylamine.
13. The process of claim 7 wherein the glycidyl ester is glycidyl ester of rosin and the nitrogen compound is n-butylamine.

References Cited by the Examiner
UNITED STATES PATENTS

| | | | |
|---|---|---|---|
| 1,984,713 | 12/1934 | Weiland et al. | 260—468.5 |
| 2,448,602 | 9/1948 | Kester et al. | 260—103 |
| 3,170,938 | 2/1965 | Levis | 260—102 |

LEON J. BERCOVITZ, *Primary Examiner.*

F. McKELVEY, *Assistant Examiner.*